Figure 1:
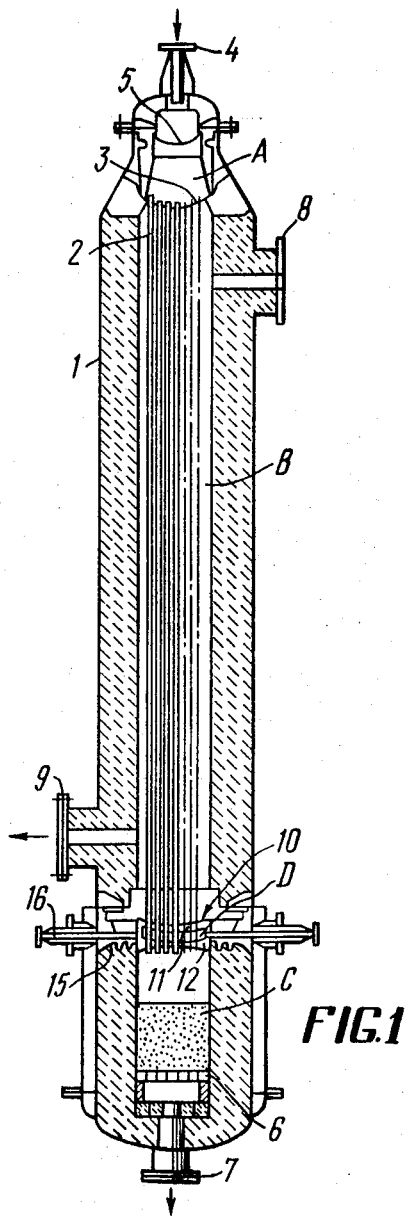

United States Patent [19]

Semenov

[11] 3,751,228

[45] Aug. 7, 1973

[54] APPARATUS FOR REFORMING HYDROCARBONS UNDER PRESSURE

[76] Inventor: Vladimir Petrovich Semenov, Vodkovsky pereulok, 4/6, kv. 69, Moscow, U.S.S.R.

[22] Filed: Dec. 16, 1970

[21] Appl. No.: 98,546

[52] U.S. Cl. ............. 23/289, 23/288 M, 23/288 R, 48/197 R, 165/82, 260/449.5, 423/359
[51] Int. Cl. ............................................. B01j 9/04
[58] Field of Search ............ 23/288 M, 288 R, 23/289; 48/196, 197; 165/82

[56] References Cited
UNITED STATES PATENTS 2,894,826  7/1959  Stengel ........................ 23/288 M

*Primary Examiner*—James H. Tayman, Jr.
*Attorney*—Holman & Stern

[57] ABSTRACT

An apparatus for reforming hydrocarbons under pressure comprising a heat-exchange chamber incorporating reaction tubes for effecting a process of primary reforming and a shaft chamber for effecting a process of secondary reforming located at the open ends of the reaction tubes. The heat-exchange chamber is separated from the shaft chamber by a double transverse partition having walls forming an intermiate chamber for supplying gaseous reagents. This intermediate chamber is completely isolated from the heat-exchange chamber and is in communication with the shaft chamber.

1 Claim, 2 Drawing Figures

APPARATUS FOR REFORMING HYDROCARBONS UNDER PRESSURE

The present invention relates to chemical industry equipment and, more particularly, the invention relates to apparatus for reforming hydrocarbons under pressure. Such an apparatus can advantageously be used for producing a process gas during the production of ammonia.

Known in the art is an apparatus for reforming hydrocarbons under pressure U.S. Pat. No. 2,894,826 cl. 23–288) comprising a furnace having walls of a refractory material and incorporating reaction tubes filled with a catalyst. A mixture of hydrocarbons with steam is fed to the tubes through a collector. The catalyst is secured within the tubes with the help of grates provided at the inlet and outlet openings of the reaction tubes. The upper portion of the furnace is equipped with burners to burn out a combustible gas, the evolved heat being used for heating the reaction tubes, necessary for conducting a process of primary reforming of hydrocarbons with steam.

Provided in the bottom portion of the furnace is a perforated plate, the reaction tubes extending therethrough, and a shaft chamber being mounted below the perforated plate to effect the process of secondary reforming.

The mixture of hydrocarbons with steam is fed through an inlet collector into the reaction tubes where an endothermic reaction is effected in the catalyst layer for reforming the hydrocarbons with steam. The reaction is accompanied by production of hydrogen and other components, the heat for conducting the said reaction being provided in the process of fuel combustion. From the tubes the reaction mixture is fed into the shaft chamber, a portion of the exhaust gases being fed into the same chamber for producing a nitrogen-hydrogen mixture. The components of converted gas are oxidized by the oxygen of the exhaust gases, the evolved heat being used for effecting the process of secondary reforming. Then the nitro-hydrogen mixture is removed from the apparatus.

Thus, in the known apparatus two processes are effected: a process of steam reforming and a process of air-steam reforming with production of a converted gas suitable for synthesis of ammonia. However, the use of a perforated plate connecting the heat-exchange chamber with the shaft chamber in the known apparatus requires a supply of process nitrogen with the exhaust gases and this, in turn, necessitates the reaction of steam reforming in the reaction tubes to be complete in contrast to the case where the process nitrogen is supplied with air. Such an operation reduces the efficiency of the reaction tubes and deteriorates their operating conditions. In the known apparatus the converted combustible gas is mixed with exhaust gases containing oxygen directly within the catalyst layer. This leads to overheating of the catalyst due to the process of combustion of the combustible components on the catalyst and to rapid destruction thereof.

In addition, the supply of the required nitrogen with the exhaust gases is associated with a possible poisoning of the catalyst by contact poisons (for example, sulphur), with the result that the process requires purification of a considerable volume of air consumed during the combustion of a fuel to generate the heat for conducting the endothermal reaction of reforming in the tubes, in which case the consumption of air for the process of combustion considerably exceeds the consumption of air for effecting the technological process.

An object of the present invention is to provide an apparatus for reforming hydrocarbons under pressure which, while combining in a single apparatus both the process of steam reforming in the reaction tubes and the process of steam-air reforming in the catalyst layer, will make it possible to supply the process nitrogen not from the exhaust gases but from the process air and to effect the process of combustion of the components of the converted gas not in the catalyst layer but in a free space.

These objects are attained in the apparatus for reforming hydrocarbons under pressure, according to the present invention, wherein the heat-exchange chamber is separated from the shaft chamber by means of a transverse double partition whose walls form an intermediate chamber for admitting gaseous reagents and with the ends of the reaction tubes extending through this partition. The above-said chamber for admitting gaseous reagents is completely isolated from the heat-exchange chamber and is in communication with the shaft chamber.

To connect the chamber for admitting gaseous reagents with the shaft chamber, the reaction tubes may pass through the wall of the double partition facing the shaft chamber with a gap, in which case perforated sleeves may be secured in this wall, the said perforated sleeves being located concentrically and having a gap with respect to the reaction tubes.

The reactions tubes are preferably secured in the wall of the double partition facing the furnace chamber through sliding packed joints.

The double partition is preferably secured in the apparatus with the help of a thermal elongation compensator.

Such an apparatus makes it possible to supply process nitrogen from air and not from the exhaust gases, in which case the efficiency and output of the apparatus are increased considerably.

Figure 2:
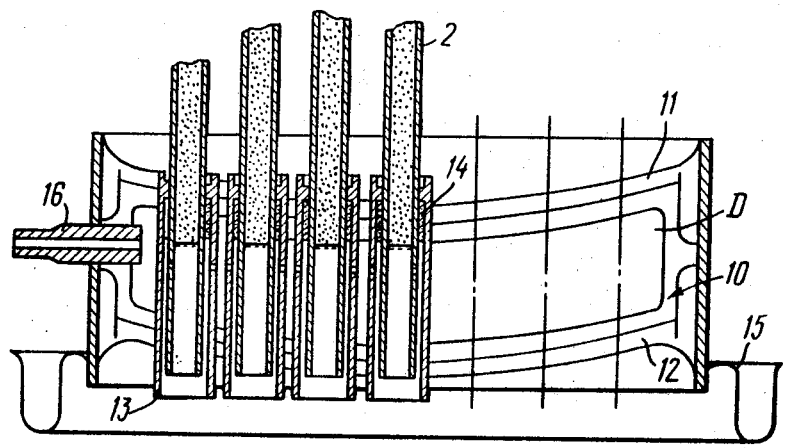

Other objects and advantages of the invention will be apparent from the following description of some embodiments thereof, reference being made to the appended drawings, in which:

FIG. 1 is a longitudinal section of the apparatus for reforming hydrocarbons under pressure according to the invention; and FIG. 2 is an enlarged view of the double partition according to the invention.

The apparatus for reforming hydrocarbons under pressure has a lined metal housing 1 (FIG. 1) with reaction tubes 2 filled with catalyst for steam reforming and secured by means of spherical tubular grate 3, a distributing chamber A located above the reaction tubes 2 and provided with a valve 4 for admitting the reaction steam-gas mixture and with a levelling grid 5 having a non-uniform perforation.

Located below the distributing chamber A is a heat exchange chamber B and a shaft chamber C filled with catalyst for secondary reforming located on a grid 6 and provided with a valve 7 for discharging the converted gas from the apparatus. The housing 1 is provided with valves 8 and 9 for inlet and outlet of the heating gases respectively.

The heat-exchange chamber B is separated from the shaft chamber C by a transverse double partition 10.

The wall 11 of the double partition 10 facing the heat-exchange chamber B and the wall 12 of the double ble partition 10 facing the shaft chamber C form an intermediate chamber D for admitting gaseous reagents, for example, process air. The wall 11 completely isolates the chamber D from the heat-exchanger chamber B, while the wall 12 permits the chamber D to communicate with the shaft chamber C through the gaps between the reaction tubes 2 and the perforated sleeves 13 (FIG. 2) secured in the wall 12 concentrically with respect to the reaction tubes 2.

The sleeves 13 are rigidly secured in the wall 11, and in the upper portion of the sleeves 13 there are placed sliding packed joints 14 made of a high-refractory material.

The perforation in the sleeves 13 is made below the zone of disposition of the sliding packed joints 14. As a result, the wall 11 separates the heat-exchange chamber B (FIG. 1) from the chamber D, but the reaction tubes 2, while elongating during the heating, can slide in the longitudinal direction with respect to the double partition 10.

The double partition 10 is secured in the housing of the apparatus through a compensator 15 of thermal elongations and is provided with an inlet 16 for supplying process air into the chamber D.

The apparatus for reforming hydrocarbons under pressure operates as follows:

The initial mixture of hydrocarbons with steam is fed through the valve 4 into the distributing chamber A, in which the mixture is levelled throughout the cross section of the apparatus due to the non-uniform perforation of the grid 5. The distributed mixture is fed into the reaction tubes 2 in which a process of catalytic steam reforming of hydrocarbons is effected in the catalyst layer due to the heat of the heating gases. The heating gases are fed through the valve 8 into the heat-exchange chamber B incorporating the reaction tubes 2. The heating gases which have been cooled due to the heat transfer to the reaction tubes 2 are exhausted from the apparatus through the valve 9.

The converted gas produced in the reaction tubes 2 is fed to the shaft chamber C for secondary reforming. The reagent required for conducting the process of secondary reforming, for example, air, is fed into the shaft chamber C from the chamber D through the annular gaps between the perforated sleeves 13 and the reaction tubes 2. The perforation provided in the sleeves 13 allows the air fed from the chamber D to be uniformly distributed throughout the whole section of the shaft chamber C.

A homogeneous combustion reactions occurs in the mixture of the reagent with the converted gas. Then the reaction mixture is fed onto the catalyst for secondary reforming located on the grid 6, the obtained converted gas being removed from the apparatus through the valve 7.

Due to the fact that the heat-exchange chamber B is completely isolated from the secondary reforming shaft chamber C by means of the double partition 10, it is possible to supply the process nitrogen from air and not from the exhaust gases. It allows one to increase the efficiency of the reaction tubes 2 and to improve their operating conditions, to effect the homogeneous combustion reaction of the components of the converted gas above the catalyst layer in the chamber C and to prolong the service life of the catalyst. The proposed apparatus does not require purification of a considerable volume of air consumed in the process of combustion.

I claim:

1. Apparatus for reforming hydrocarbons under pressure which comprises: a heat exchange chamber; branch pipes located in the heat exchange chamber for feeding and removing heating gases; reaction tubes filled with catalyst mounted within said heat exchanger for effecting a process of primary reforming; an inlet provided at one end of said reaction tubes with said reaction tubes being open at the opposite end; a shaft chamber for effecting a process of secondary reforming located at the open ends of said reaction tubes; and outlet in said shaft chamber for removing reformed hydrocarbons from said shaft chamber; a double transverse partition separating said heat exchange chamber from said shaft chamber; an intermediate chamber for admitting gaseous reagents formed by the walls of said double partition through which extend the ends of said reaction tubes; perforated sleeves mounted in the wall of said double partition adjacent said shaft chamber, each of said perforated sleeves having a reaction tube disposed concentrically therein in a spaced relationship; said intermediate chamber being completely isolated from said heat exchange chamber and communicating with said shaft chamber through the spacing between the reaction tubes and perforated sleeves.

* * * * *